Jan. 17, 1928.
C. H. CURRIER
1,656,173
DRYING DEVICE
Filed June 23, 1924
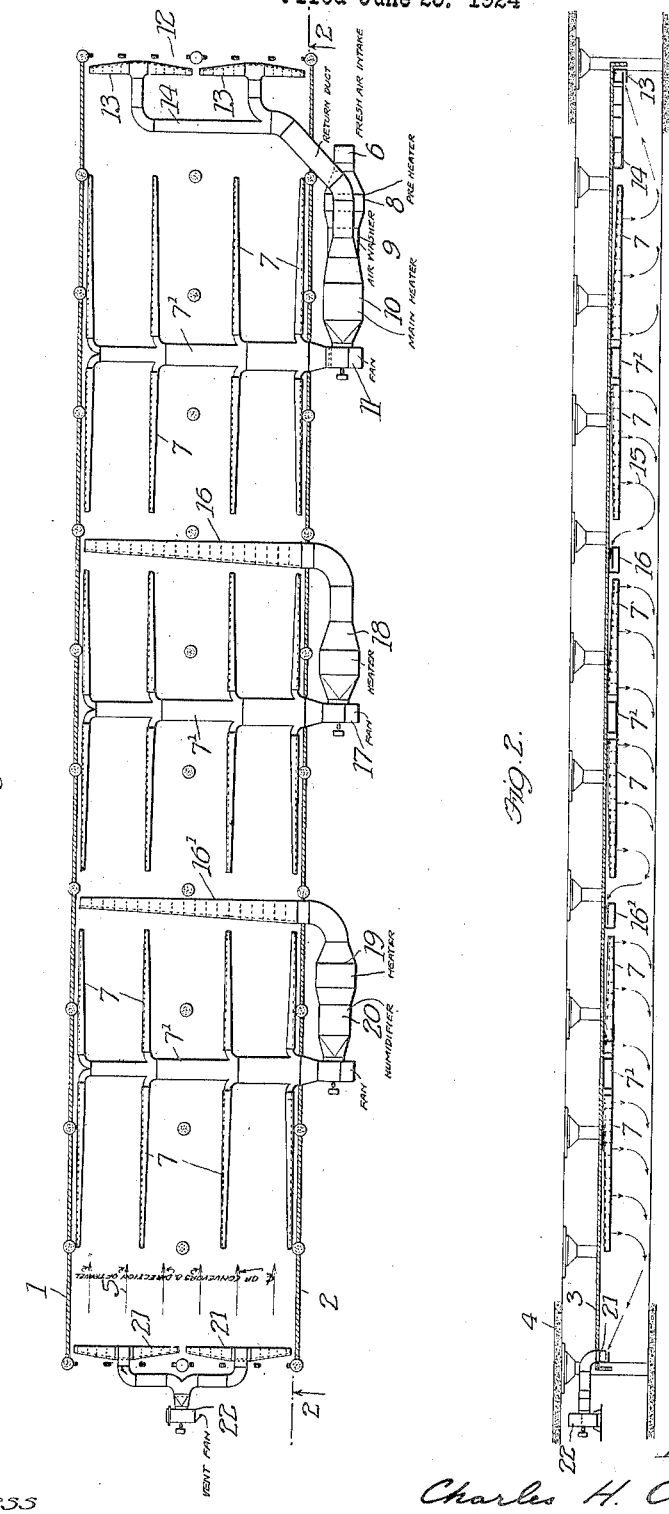

Patented Jan. 17, 1928.

1,656,173

UNITED STATES PATENT OFFICE.

CHARLES H. CURRIER, OF CHICAGO, ILLINOIS.

DRYING DEVICE.

Application filed June 23, 1924. Serial No. 721,793.

This invention relates to the art of drying and is particularly applicable for use in connection with open ended drying rooms or tunnels, through which the material treated is caused to travel during the drying operation. The object of the invention is principally to increase the efficiency of drying methods and apparatus, and also to overcome a serious tendency to uneven drying, due to the stratification of the air in existing apparatus of the same general type.

The open ended drying room now commonly in use has delivered thereto heated and otherwise properly conditioned air, either at one or several points in the room, the air being caused to travel along the room and is usually exhausted at the open ends. Due to the fact that the ends of the room are open, and because heated air used in the drying process is of considerably higher temperature, and therefore much lighter than the air outside the room, the cool outer air is free to enter the drying room at the lower parts of its open ends and travel inwardly possibly ⅛ to ¼ of the length or so, before meeting the currents of heated air, and rising and being turned backwardly and carried out of the room with the heated air.

To overcome this difficulty and needless loss of heat and slow and uneven drying, it is proposed by the present invention to forcibly effect proper circulation and prevent the entrance of unconditioned cool air by successively blowing into the apparatus and withdrawing therefrom, at suitable locations, a continuous stream of properly conditioned air which may in some cases be reheated and rewashed or humidified at the successive stages. The result is that only such air as is actually desired for the drying operation passes into the drying room, and the heat and moisture of this air is expended in useful work, except for radiation losses which are inherent in any such apparatus.

In the drawings:—

Fig. 1 is a plan of an oven, wide enough for a plurality of conveyor systems or passageways disposed side by side.

Fig. 2 is a vertical section on the line 2—2 of Fig. 1.

This invention may be carried into effect by the use of any of the common forms of open ended drying rooms or tunnels, either singly or in series, or arranged side by side as is common in the art to suit the requirements, some articles or materials being re-coated or treated between successive drying operations taking place through a series of drying rooms.

The construction shown in the drawings is a rectangular room or tunnel having located along its length a series of air delivering conduits for uniformly distributing properly conditioned air to the drying room in a downward direction. The general path of travel of the air in the room is opposite to the direction of travel of the material operated upon. The first system of air delivering conduits receives fresh air from the exterior of the drying room, which air is first washed, humidified and heated. The remaining air delivering conduits also communicate with air conditioning apparatus, but the air for these conduits is withdrawn from the drying room at suitable intervals. The used air is finally pumped out of the drying room at the entering end for the material operated upon. By this arrangement the drying may be effected by air which is reconditioned or has its temperature changed and its moisture content varied, at different stages in the process of drying and without needless loss of heat.

Referring to the drawing, a suitable floor space is shown for receiving the drying room, consisting of side walls 1 and 2 and its own ceiling 3, spaced below the ceiling 4 of the floor within which the drying room is located. The air conditioning apparatus may be located out of the way above the plane of the ceiling 3. The articles or material treated during the drying process travel from left to right as indicated by the arrows 5, which are also in the center line of a plurality of continuous conveyors for carrying materials to be dried, but which conveyors are not shown in the drawing. The general direction of the air through the drying room is from right to left, oppositely to the direction of the material treated. The fresh air intake is indicated by the numeral 6 and supplies air to the first set of air delivering conduits 7. Before entering the distributing conduit 7, the air passes through a pre-heater 8, washer and humidifier 9, a main heater 10 and fan 11. Some of the air passing through the heater 10 and fan 11 to the distributor 7 is preferably taken from the discharge end 12 of the drying room by means of intake nozzles 13, connected with the air heater 10 by the conduits 14.

As indicated by the arrows 15 in Fig. 2, the distributing nozzles 7 discharge the air downwardly, most of it passing through the articles or material on the conveyors and then to the left toward an intake nozzle 16. This intake nozzle has the air drawn through it by a fan 17 which then causes the same air to be discharged through an air distributing system 7'. The nozzles indicated in the drawings are of the construction fully illustrated in the patent to Burt S. Harrison, No. 1,506,904, in which a tapering conical tube is provided with a slit or opening along one side to furnish a long narrow opening in which the pressure is evenly distributed throughout the length. The nozzles of all the air intake and distributing devices are designed to effect an even or uniform flow of the air in the drying room. The used air entering one of the intakes 16 or 16' may have its temperature or moisture content varied by traveling through the heater 18 or through a heater 19 and humidifier 20 and thus be suitably reconditioned to vary the nature or rate of its work upon the material passing through the drying room. Thus, in some cases, the air may have its maximum humidity at the entering end and its maximum temperature at the work discharge end of the drying room as required for best results, depending upon what work is to be performed. The used air is finally exhausted from the work entering end of the drying room by the exhaust nozzles 21, through which the air is drawn by a ventilating fan 22.

In the operation of the device, the articles treated are caused to travel from left to right as indicated by arrows 5, whereas the general direction of the air pumped through the drying room is from right to left. The condition of this air is changed to suit the operation by successively withdrawing it at intervals in the drying room and reconditioning the air and again forcibly delivering such air to the drying room with the air uniformly distributed and having a direction which will insure substantially uniform contact of the air all over the surfaces of the articles treated. In some cases the distributing conduits or nozzles are preferably located near the floor of the drying room rather than near the ceiling, as shown in the drawing. These nozzles discharge downwardly but in other arrangements discharge horizontally or in an upward direction.

In an open ended or unlocked oven, to properly hold the heat at the ends where the work enters and leaves requires that the oven be practically filled with warm conditioned air, as otherwise, due to the difference in the pressure on account of the difference in the weight between the warm air inside the oven and the cooler air outside the oven, the cooler air will rush in along the floor of the ovens, dilute and mix with the warm air, so that the ends, for a considerable distance such as from $\frac{1}{8}$ to $\frac{1}{4}$ the length of the ovens, will be coldest at the bottom, cool in the middle and only fairly warm at the top.

This fault is ordinarily overcome by the use of a much greater volume of air than is needed to accomplish the drying work, with a result that there is vented at the ends of the ovens a considerable quantity of air which has not performed useful work and the efficiency of the oven becomes very low when compared with a completely locked oven, in which the heat is entirely trapped.

To overcome this disadvantage of the open ended or unlocked ovens, the idea is to use the same quantity of air over and over again by picking it up at the roof of the dry room and recirculating it over the work so that the heat in same is absorbed in useful drying and not wasted at the ends of the ovens.

Although but one specific embodiment of this invention has been herein shown and described, it will be understood that numerous details of the construction shown may be altered or omitted without departing from the spirit of this invention as defined by the following claims.

I claim:

1. In an open ended drying room having work to be dried entering at one end and leaving at the opposite end, suction nozzles located above the entrance and exit of the room; a series of air distributor nozzles located across the upper part along the length of the room for directing air downwardly, suction nozzles located between said air distributors, means for drawing air out through the suction nozzle at the entrance, and means for drawing air out through each succeeding nozzle and discharging the same into the next preceding distributor.

2. In a drying room a series of spaced distributor ducts extending across the upper portion of the room, a plurality of distributor nozzles extending from both sides of the ducts and parallel to the length of the room, suction nozzles extending across the room at the ends of the distributor nozzles, means for drawing air out through each of the suction nozzles and discharging the same into the next preceding distributor duct, and means for conditioning the air drawn out through the suction nozzles.

Signed at Chicago this 10th day of June, 1924.

CHARLES H. CURRIER.